(12) United States Patent
Maynus et al.

(10) Patent No.: US 10,853,860 B2
(45) Date of Patent: Dec. 1, 2020

(54) SYSTEMS AND METHODS FOR REQUESTING A QUOTE, PROCESSING AN ORDER, OR REQUESTING SUPPORT

(71) Applicant: Siemens Industry, Inc., Alpharetta, GA (US)

(72) Inventors: Ryan D. Maynus, Cincinnati, OH (US); Joseph P. Moreland, Cincinnati, OH (US)

(73) Assignee: Siemens Industry, Inc., Alpharetta, GA (US)

(*) Notice: Subject to any disclaimer, the term of this patent is extended or adjusted under 35 U.S.C. 154(b) by 796 days.

(21) Appl. No.: 14/787,357

(22) PCT Filed: May 27, 2014

(86) PCT No.: PCT/US2014/039530
§ 371 (c)(1),
(2) Date: Oct. 27, 2015

(87) PCT Pub. No.: WO2014/193809
PCT Pub. Date: Dec. 4, 2014

(65) Prior Publication Data
US 2016/0078511 A1 Mar. 17, 2016

Related U.S. Application Data

(60) Provisional application No. 61/827,791, filed on May 28, 2013.

(51) Int. Cl.
*G06Q 30/06* (2012.01)
*G06Q 30/00* (2012.01)

(52) U.S. Cl.
CPC ....... *G06Q 30/0611* (2013.01); *G06Q 30/016* (2013.01); *G06Q 30/0633* (2013.01)

(58) Field of Classification Search
CPC .............................. G06Q 30/00–08
See application file for complete search history.

(56) References Cited

U.S. PATENT DOCUMENTS 7,340,416 B1    3/2008  Larabee et al.
2004/0073468 A1* 4/2004  Vyas ............... G06Q 10/0631
                                                705/7.13
(Continued)

FOREIGN PATENT DOCUMENTS

CN    101167077 A    4/2008
CN    101828208 A    9/2010
(Continued)

OTHER PUBLICATIONS

Point 5(R) Technologies Launches New e-Toolbox at Automotive Aftermarket Products Expo; E-Commerce Tool Provides Cost-effective Online Parts Ordering. PR Newswire; New York [New York]Oct. 31, 2000: 1. Retrieved via ProQuest. (Year: 2000).*

(Continued)

*Primary Examiner* — Michael Misiaszek

(57) ABSTRACT

A system for requesting a quote, processing an order, or requesting support for a part of an electric machine is described. The system includes a user interface device with a memory device storing a computer program with executable instructions, and a communication network interfacing with the user interface device and adapted to transmit data. The computer program includes instructions to transmit an electronic communication via the communication network. The electronic communication contains data relating to the part of the electric machine for requesting a quote, processing an order, or requesting support of the electric machine.

10 Claims, 11 Drawing Sheets

(56) References Cited

U.S. PATENT DOCUMENTS

| | | | |
|---|---|---|---|
| 2004/0221243 | A1 | 11/2004 | Twerdahl et al. |
| 2010/0281374 | A1* | 11/2010 | Schulz ................. G06F 3/0482 |
| | | | 715/723 |
| 2012/0050063 | A1 | 3/2012 | Bahorich et al. |
| 2013/0032634 | A1* | 2/2013 | McKirdy ................ G06F 19/00 |
| | | | 235/375 |
| 2013/0104079 | A1 | 4/2013 | Yasui et al. |
| 2013/0211787 | A1* | 8/2013 | Kaufman ............... G05B 23/00 |
| | | | 702/188 |
| 2013/0228617 | A1* | 9/2013 | O'Brien ............. G06K 7/10544 |
| | | | 235/375 |

FOREIGN PATENT DOCUMENTS

| | | |
|---|---|---|
| CN | 102592206 A | 7/2012 |
| CN | 102934133 A | 2/2013 |
| JP | 2009003909 A | 1/2009 |
| RU | 2254611 C2 | 6/2005 |
| WO | 2006094086 A2 | 9/2006 |

OTHER PUBLICATIONS

GCS E-Commerce Solution Transforms Ordering System for North America's Largest Supplier of Machine Tools PR Newswire; New York [New York]Jun. 7, 1999: 1. Retrieved via ProQuest. (Year: 1999).*

Insurance Auto Auctions Adds Recycled Parts Locating Tool to Online Sen/ice Offerings PR Newswire; New York [New York]Oct 1, 2002: 1. Retrieved via ProQuest. (Year: 2002)*

PCT International Search Report and Written Opinion dated Mar. 16, 2015 corresponding to PCT Application No. PCT/US2014/039530 filed May 27, 2014 (8 Pages).

* cited by examiner

SYSTEMS AND METHODS FOR REQUESTING A QUOTE, PROCESSING AN ORDER, OR REQUESTING SUPPORT

CROSS REFERENCE TO RELATED APPLICATIONS

This Application is the U.S. National Stage of International Application No. PCT/US2014/039530 filed 27 May 2014 and claims benefit thereof, the entire content of which is hereby incorporated herein by reference. The International Application claims priority to U.S. Provisional Application No. 61/827,791 filed 28 May 2013, the entire content of which is hereby incorporated herein by reference.

BACKGROUND

1. Field

Aspects of the present invention relate to quoting/ordering/support request systems and methods and, more particularly, to remote quoting/ordering/support request systems and methods for replacement parts for a motor, whereby the remote quoting/ordering/support request systems and methods are adapted to be controlled via a handheld device.

2. Description of the Related Art

Currently, requesting a quote, ordering spares, or requesting support for a machine, such as a motor, includes completing a form and submitting the quote/order via facsimile or e-mail, or orally over a phone call. In order to properly request a quote, order the right item or spare part, or request support, a copy of the drawings for the machine is often necessary. Oftentimes, the wrong part is quoted or ordered usually because the part number sought is transcribed improperly or distorted in transmission. Ultimately, many customers require support but find it difficult to obtain it and in a timely manner. Without timely support, customers can lose significant revenue.

Improved quote, ordering, and/or support systems and methods are desired.

SUMMARY

Briefly described, aspects of the present invention relate to systems and methods of providing customer support.

A first aspect of the invention provides a system for requesting a quote, processing an order, or requesting support for at least one part of an electric machine. The system comprises a user interface device comprising a memory device storing a computer program with executable instructions, and a communication network interfacing with the user interface device and adapted to transmit data. The computer program comprises instructions to transmit an electronic communication via the communication network. The electronic communication contains data relating to the at least one part of the electric machine for requesting a quote, processing an order, or requesting support of the electric machine.

A second aspect of the invention provides a computer program product embodied in a computer-readable medium. The computer program product comprises instructions to capture data of at least one part of an electric machine, instructions to store the data of the at least one part of the electric machine, and instructions to transmit an electronic communication containing the data via a communication network for requesting a quote, processing an order, or requesting support of the electric machine.

A third aspect of the invention provides a method for requesting a quote, processing an order or requesting support for at least one part of an electric machine. The method comprises capturing data of at least one part of an electric machine, storing the data of the at least one part of the electric machine, transmitting an electronic communication containing the data via a communication network for requesting a quote, processing an order, or requesting support of the electric machine, and responding to the electronic communication via the communication network.

DETAILED DESCRIPTION

To facilitate an understanding of embodiments, principles, and features of the present invention, they are explained hereinafter with reference to implementation in illustrative embodiments. In particular, they are described in the context of being a systems and methods of improving requesting quotes, ordering parts, and customer support. Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In an exemplary embodiment, aspects of the present invention relate to a mobile application provided on a handheld device, such as a Smartphone, tablet, or like device, that permits a user to walk freely without wired tethering. In an alternative embodiment, a hands-free device can be used in aspects of the present invention. The mobile application is adapted to communicate a request for parts to quote or order.

In an exemplary embodiment, the quoting/ordering/requesting support system (although referred to herein, oftentimes, for simplicity, as the "ordering system" one skilled in the art would appreciate that aspects of the ordering system can also be used as a quoting system or a system to request support) comprises an application system for providing information and providing a means of communication a request for a quote, an order of a part or item, and/or a request for customer support.

In aspects of the present invention, the term machine as used herein may refer to multi-part systems. In an exemplary embodiment, for example a motor, such as an induction motor, "machine" may refer to many parts of a motor. In a motor example, "machine" may further refer to, for example and without limitation, bearings, bearing seals, air filters, bearing and stator RTDs, rotors, stators, nameplates, and the like.

Figure 1:
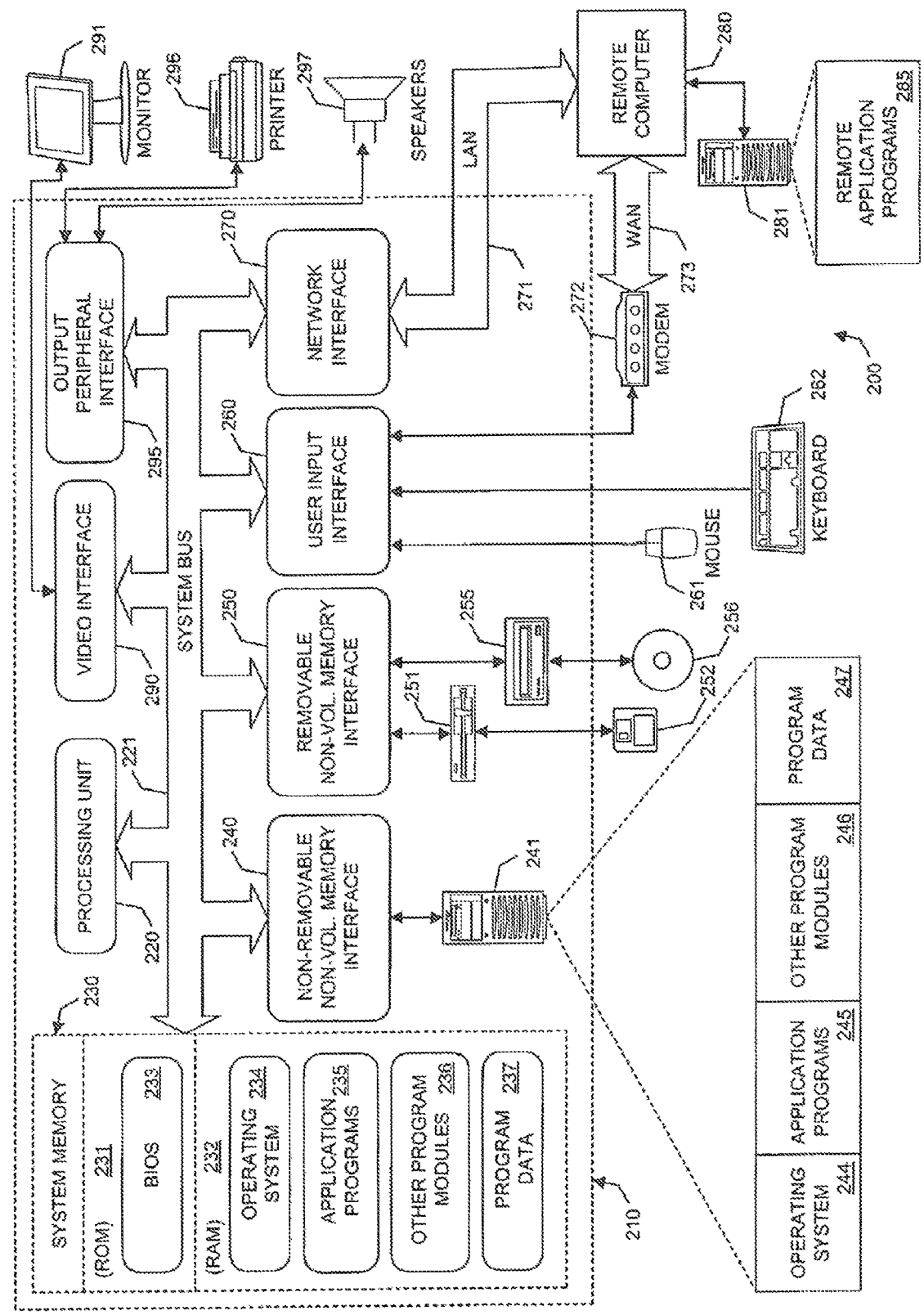
FIG. 1 is a block diagram representation of a computing environment and computer systems thereof, which a system of the present invention may utilize, in accordance with an exemplary embodiment of the present invention.

Referring now to FIG. 1, it displays a block diagram representation of a computing environment 200 and computer systems 210, 280 thereof, which an ordering system may utilize, in accordance with an exemplary embodiment of the present invention. The computing environment 200 and the computer systems 210, 280 represent one example of a suitable computing environment and computer systems for the practice of embodiments of the present invention and are not intended to suggest any limitation as to the scope of use or functionality of the invention. Nor should the computer systems 210, 280 be interpreted as having dependency or requirement relating to the combination of components illustrated in the exemplary computing environment 200.

Embodiments of the present invention are operational with numerous other general purposes or special purposes computing system environments or configurations. Examples of well-known computing systems, environments, and/or configurations that may be appropriate or suitable for use as client systems include, but are not limited to, personal computers, server computers, hand-held or laptop devices, tablets, smart phones, multiprocessor systems, microprocessor-based systems, set top boxes, programmable consumer electronics, network PCs, minicomputers, mainframe computers, distributed computing environments that include portions of the above systems or devices, and the like.

Embodiments of the present invention may also be described in the general context of comprising computer-executable instructions, such as program modules, being executed by a computer system. Generally, program modules include routines, programs, programming, objects, components, data, data structures, and the like that perform particular tasks or implement particular abstract data types. Embodiments of the present invention may be practiced in distributed computing environments where tasks are performed by remote processing devices that are linked through a communications network. In a distributed computing environment, program modules may be located in both local and remote computer storage media, including, without limitation, in memory storage devices.

Exemplary client systems, telephony home servers, and proxy servers may comprise general purpose computing devices in the form of the computer system 210, as illustrated in FIG. 1. Components of the computer system 210 may include, but are not limited to, a processing unit 220, a system memory 230, and a system bus 221 that couples various system components including the system memory 230 to the processing unit 220 for bi-directional data and/or instruction communication. The system bus 221 may be many of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

The computer system 210 can include and interact with a variety of computer-readable media. The computer-readable media may comprise many available media that can be accessed by, read from or written to by the computer system 210 and may include both volatile and non-volatile, removable, and non-removable media. For example and not limitation, computer-readable media may comprise computer storage media and communication media. Computer storage media includes volatile and non-volatile, removable, and non-removable media implemented in many methods or technologies for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or other media that can be used to store the desired information and may be accessed by computer system 210. Communication media typically embodies computer-readable instructions, data, data structures, program modules, programs, programming, or routines in a modulated data signal, such as a carrier wave or other transport mechanism and includes any information delivery media.

The term "modulated data signal" means a signal that has one or more of its characteristics set or changed in such a manner as to encode information in the signal. For example and not limitation, communication media includes wired media such as a wired network or direct-wired connection, and wireless media such as acoustic, RF, infrared and other wireless media. Various combinations of the above are also included within the scope of computer-readable media.

The system memory 230 may include computer storage media in the form of volatile and/or non-volatile memory such as read only memory (ROM) 231 and random access memory (RAM) 232. A basic input/output system 233 (BIOS), containing the basic routines that direct the transfer of information between elements within the computer system 210, such as during start-up, is typically stored in ROM 231. RAM 232 typically stores data and/or program instructions that are immediately accessible to and/or presently being operated on by the processing unit 220. By way of example, and not limiting, FIG. 1 illustrates an operating system 234, application programs 235, other program modules 236, and a program data 237, which may be resident in RAM 232, in whole or in part, from time-to-time.

The computer system 210 may also include other removable/non-removable, volatile/non-volatile computer storage media. By way of example only, FIG. 1 illustrates a hard disk drive 241 that reads from or writes to non-removable, non-volatile magnetic media, a magnetic disk drive 251 that reads from or writes to a removable, non-volatile magnetic disk 252, and an optical disk drive 255 that reads from or writes to a removable, non-volatile optical disk 256 such as a CD ROM or other optical media. Other removable/non-removable, volatile/non-volatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above provide storage of computer-readable instructions, data, data structures, program modules, programs, programming, or routines for computer system 210. For example, the hard disk drive 241 stores operating system 244, application programs 245, other program modules 246, and program data 247. These components may either be the same as or different from operating system 234, application programs 235, other program modules 236, and program data 237. The operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices, such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device may be also connected to the system bus 221 via an interface, such as a video interface 290. In addition to the monitor 291, the computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a tablet, Smartphone, personal computer, a laptop computer, a server computer, a router, a network PC, a peer device, or other common network node, and typically includes many or all of the elements described above relative to the computer system 210, although only a memory storage device 281 of the remote computer system 280 has been illustrated in FIG. 1. The bi-directional communication connection links depicted in FIG. 1 include a local area network (LAN) 271 and a wide area network (WAN) 273, but may also include other networks. Such networks are commonplace in offices, enterprise-wide computer networks, intranets, and the Internet.

In a preferred embodiment, aspects of the present invention can include a hand-held device (e.g., tablet or Smartphone) with storage and wireless capability, meaning it can communicate via a wireless communication system, including but not limited to 1G, 2G, 3G, 4G and other cellular communication systems, but also Wi-Fi and the like.

When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The communication system, or modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limiting, FIG. 1 illustrates remote application programs 285 as residing in memory storage device 281. The network connections shown are exemplary and other means of establishing a bi-directional communication link between the computers may be used.

In an exemplary embodiment, the ordering system and method can operate on the computer system 210, and can be stored on a medium or media part of, in communication with, and/or connected to the computer system 210. In an exemplary embodiment, the ordering system can be developed in a programming language, for example and not limiting to, C, C++, Java, Assembly, COBOL, and the like. In an alternative embodiment, the ordering system can be developed atop a software program, for example and not limiting, LOTUS, Microsoft Excel, and other spreadsheet-like applications.

Figure 2:
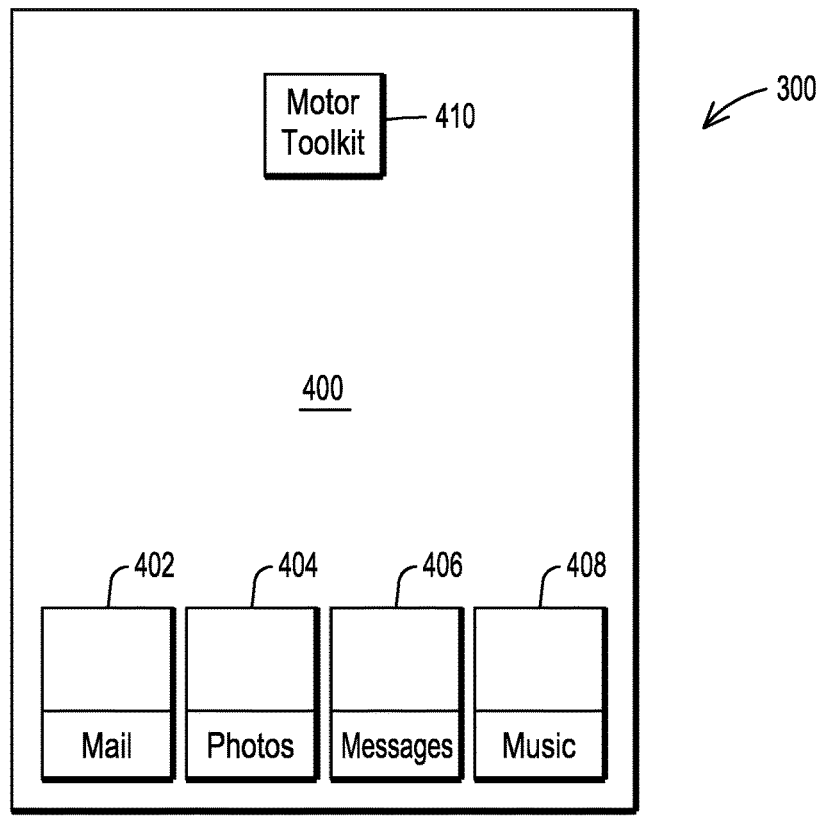
FIG. 2 is a graphical representation of a first screen shot of a user interface device, in accordance with an exemplary embodiment of the present invention.

FIG. 2 is a graphical representation of a first screen shot 400 of a user interface device 300. For example, the user interface device 300 is a hand-held touch screen device, wherein the first screen shot 400 shows a plurality of icons 402, 404, 406, 408 and 410 identifying different mobile applications. As illustrated and without limitation, icon 402 refers to the application "Mail", icon 404 to the application "Photos", icon 406 to the application "Messages," and icon 408 to the application "Music". The user interface device 300 can comprise many other applications.

The ordering system as described herein can be a mobile application identified by the icon 410 "Motor Toolkit" and a user can select, by selecting the icon 410 on the screen (also referred to as display), the application. After selecting the icon 410, a command which represents the icon can be interpreted and communicated to the appropriate application, which is the system, stored within the user interface device 300. The user has activated and thus entered the system.

In an exemplary embodiment, the mobile application "Motor Toolkit" can operate upon various operating computer systems, for example and without limitation Apple® iOS, Google® Android, Windows® operating systems, and the like.

Figure 19:
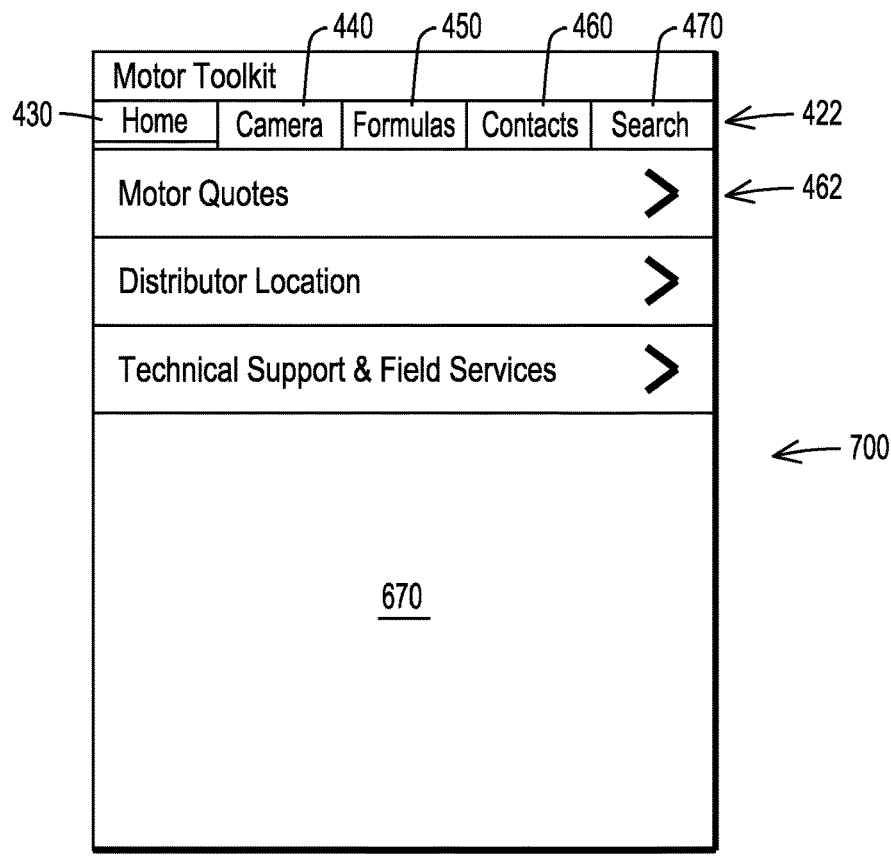
FIG. 19 is a graphical representation of an 18$^{th}$ screen shot of a user interface device, in accordance with an exemplary embodiment of the present invention.
Figure 20:
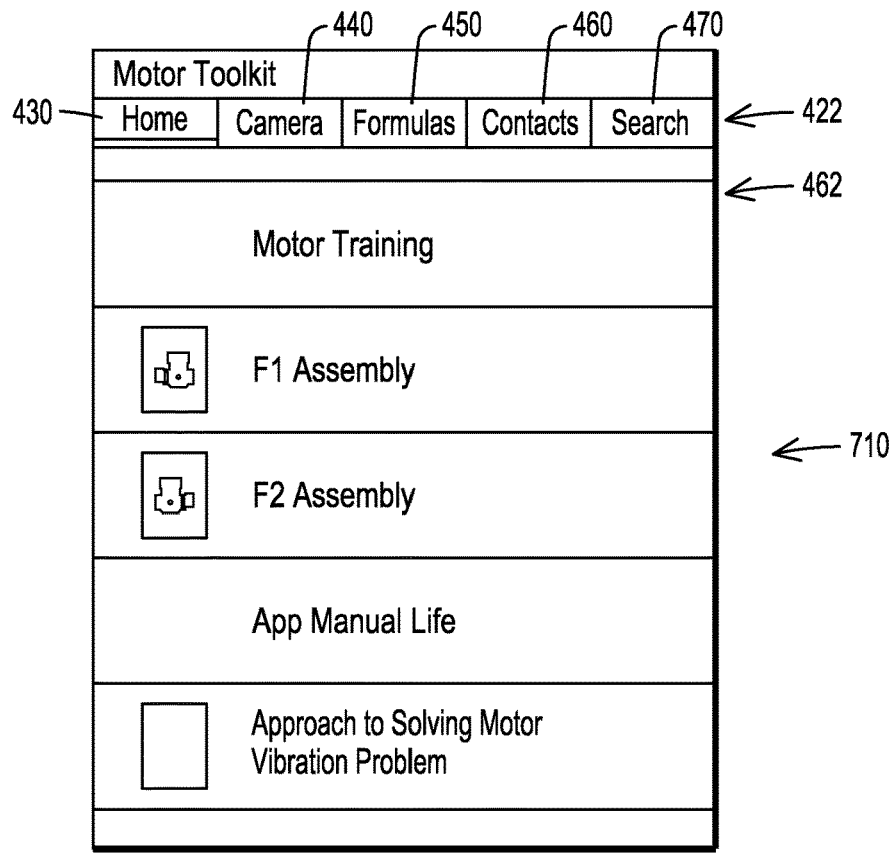
FIG. 20 is a graphical representation of a 19$^{th}$ screen shot of a user interface device, in accordance with an exemplary embodiment of the present invention.

In an exemplary embodiment, the application system "Motor Toolkit" can comprise a plurality of data, including "Knowledge" (e.g., FIGS. 3-4), "Reference" (e.g., FIGS. 5-6), "Connect" (e.g., FIGS. 7-8), "Camera" (e.g., FIGS. 9-13), "News" (e.g., FIG. 14), "History" (e.g., FIGS. 15-16), "Formulas" (e.g., FIGS. 17-18), "Contacts" (e.g., FIG. 19) and "Search" (e.g., FIG. 20).

Figure 3:
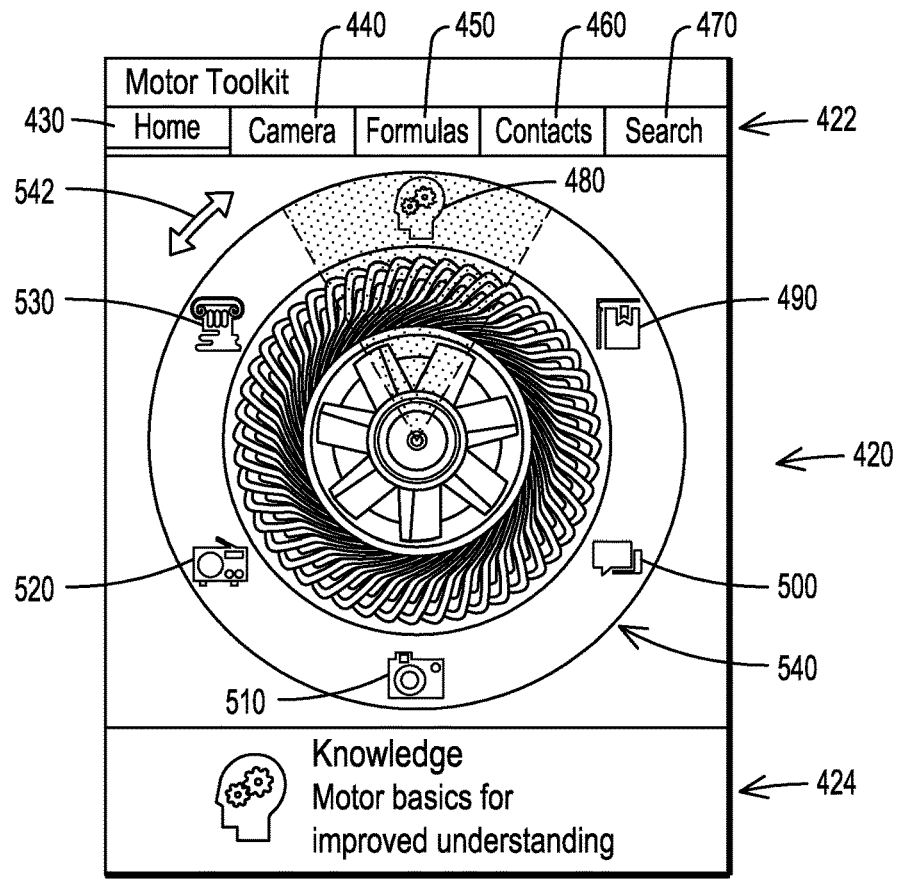
FIG. 3 is a graphical representation of a second screen shot of a user interface device, in accordance with an exemplary embodiment of the present invention.

FIG. 3 is a graphical representation of a second screen shot, for example, a first "Knowledge" screen 420. The application system can provide an intuitive user interface. With reference to the plurality of data included in the application system, each set of data can be housed under different tabs, for example and without limitation, tab 430 "Home", tab 440 "Camera", tab 450 "Formulas", tab 460 "Contacts" and tab 470 "Search," which may be arranged in a panel 422, which can be for example a predictable tab bar, or tab 480 "Knowledge", tab 490 "Reference", tab 500 "Connect", tab 510 "Camera", tab 520 "News" and tab 530 "History" which can be arranged in a navigation radar wheel 540. The tabs 440 and 510 both refer to "Camera" and, after activating, can lead to the same camera application.

As indicated by the arrow 542, which refers to the motion of the navigation radar wheel 540, the user can toggle through the tabs 480, 490, 500, 510, 520 and 530 by rotating a finger on the touch screen through the tabs. All the tabs can be toggled through by the user when the application system is open and in use by the user. The navigation radar wheel 540 can be a graphical representation of a cross section of an electric motor, wherein the wheel 540 can represent the rotating part of the electric motor rotating about the static part of the motor. Many other graphical representations can be used for arranging the plurality of data/applications.

In FIG. 3, the tab 480 "Knowledge" can be activated by the user, wherein FIG. 3 is a graphical representation of the "Knowledge" screen 420. The bottom panel 424 indicates that the "Knowledge" tab has been activated and can read "Motor basics for improved understanding". After activating the tab 480, the user now can active, by selecting, the bottom panel 424 in order to enter the knowledge data.

Figure 4:
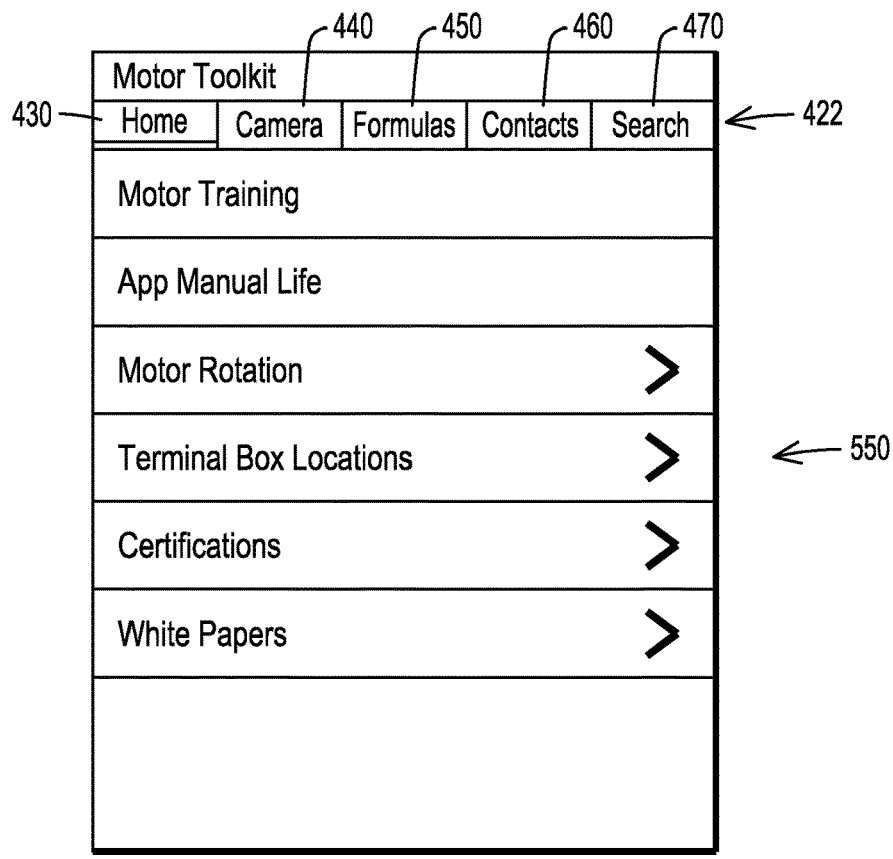
FIG. 4 is a graphical representation of a third screen shot of a user interface device, in accordance with an exemplary embodiment of the present invention.

FIG. 4 is a graphical representation of a third screen shot, a second "Knowledge" screen 550. The knowledge data can include trainings, for example "Motor Training", manuals, for example "App Manual Lite", "Motor Rotation" which can include data relating to counter clockwise rotation and clockwise rotation and where a search can be performed, terminal box locations, certifications, white papers, and the like. As FIG. 4 shows, the different knowledge data can be arranged by panels and are activated by selecting the panels.

By selecting a set of knowledge data, the user can be presented the specific data. For example, if in a motor application system, when the knowledge tab is selected and then when white papers is next selected, the user can be presented a white paper about a given motor.

Figure 5:
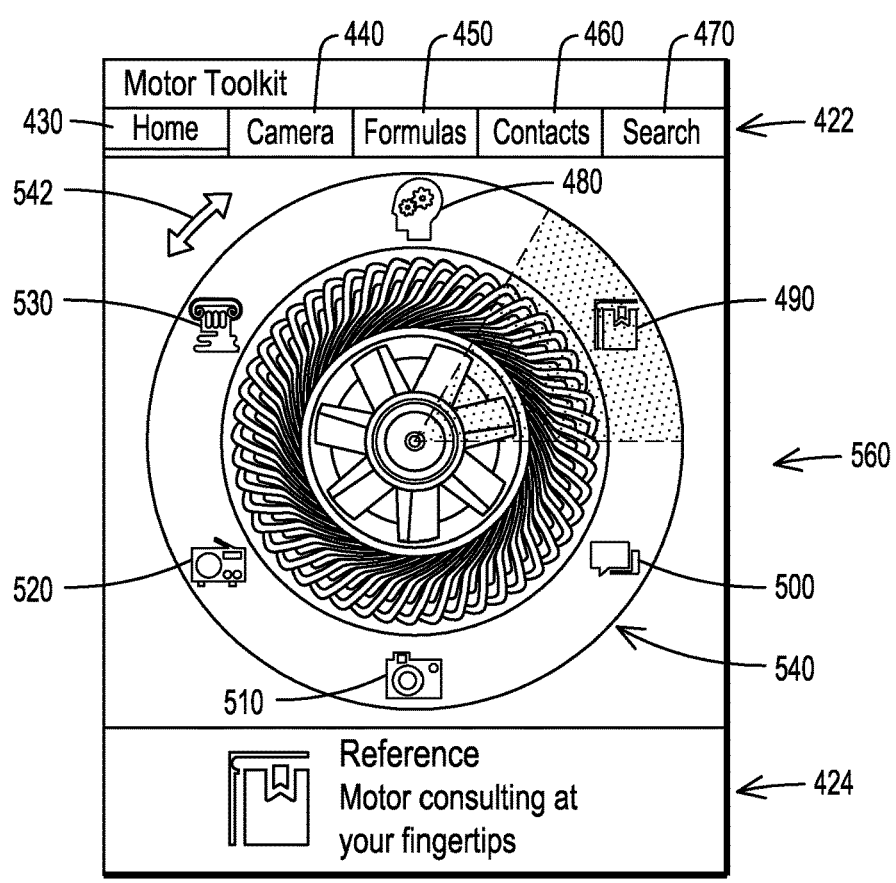
FIG. 5 is a graphical representation of a fourth screen shot of a user interface device, in accordance with an exemplary embodiment of the present invention.

FIG. 5 is a graphical representation of a fourth screen shot, a first "Reference" screen 560 which can be displayed after the tab 490 has been activated by the user. The bottom panel 424 indicates that the "Reference" data can be entered and can provide a short summary for the user what the "Reference" data may include. For example, the short summary can read "Motor consulting at your fingertips."

Figure 6:
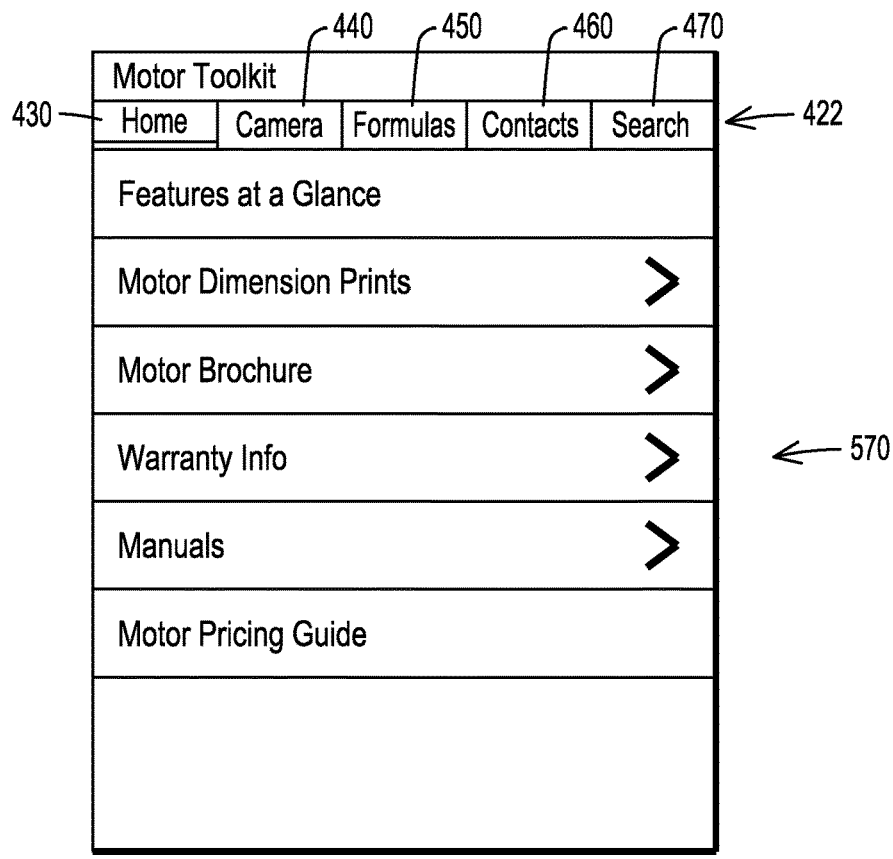
FIG. 6 is a graphical representation of a fifth screen shot of a user interface device, in accordance with an exemplary embodiment of the present invention.

FIG. 6 is a graphical representation of a fifth screen shot, a second "Reference" screen 570, which can be displayed after the bottom panel 424 (see FIG. 5) has been touched and activated. The reference data can include features of the machine, for example "Features at a Glance", dimensions, for example "Motor Dimensions Prints", motor brochures, warranty information, manuals, pricing guides, and the like. By selecting a set of reference data, the user can be presented with specific data, such as pricing for part of the machine. As FIG. 6 shows, the different reference data can be arranged by panels and can be activated by selecting the panels.

Figure 7:
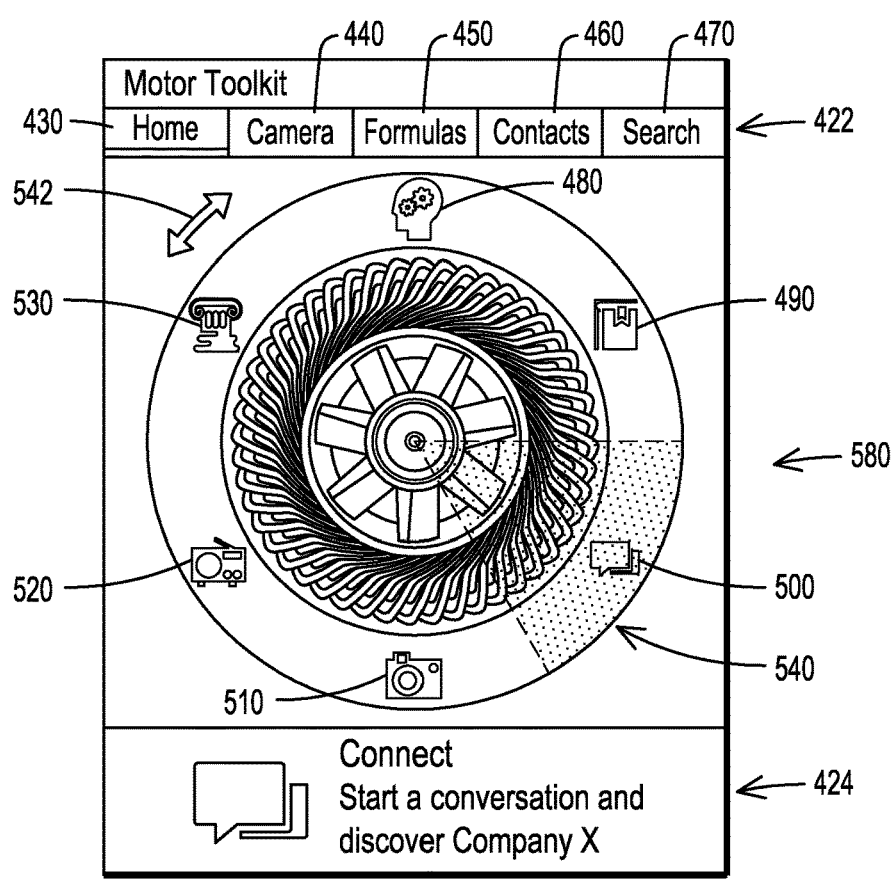
FIG. 7 is a graphical representation of a sixth screen shot of a user interface device, in accordance with an exemplary embodiment of the present invention.

FIG. 7 is a graphical representation of a sixth screen shot, a first "Connect" screen 580, which can be displayed after the tab 500 "Connect" has been activated by the user. The bottom panel 424 can indicate that the tab 500 is active. The bottom panel 424 can provide a short summary for the user what the "Connect" data/application may include. For example, the short summary can read "Start a conversation and discover Company X". In order to enter the connect data the panel 424 can be activated, i.e. touched, on the screen of the touch screen device.

Figure 8:
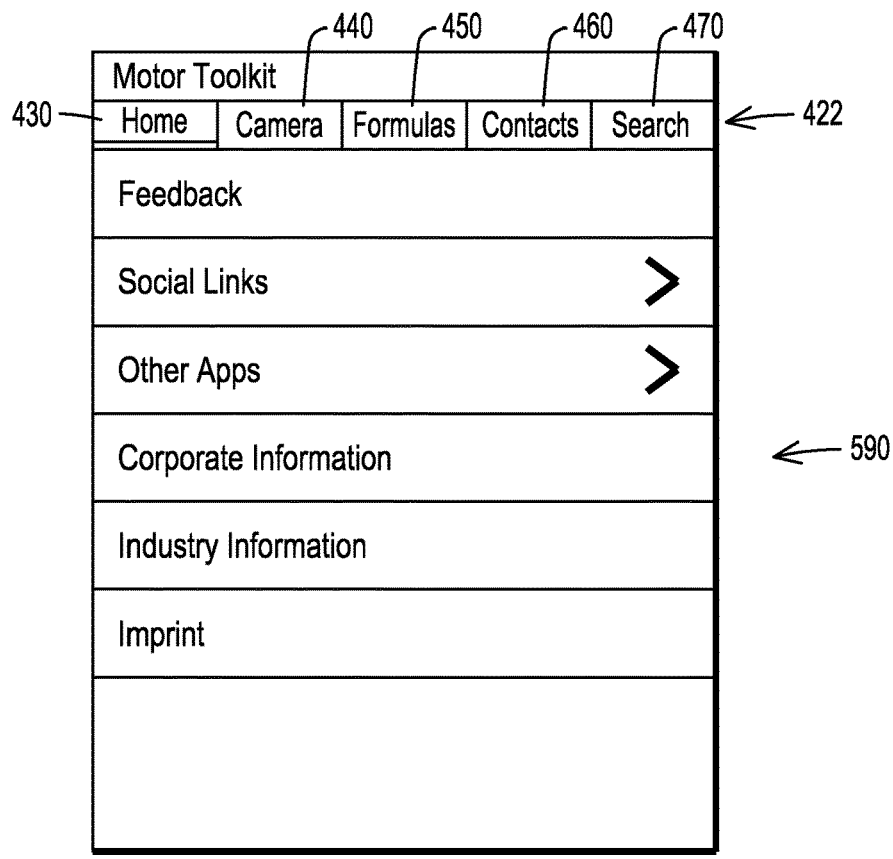
FIG. 8 is a graphical representation of a seventh screen shot of a user interface device, in accordance with an exemplary embodiment of the present invention.

FIG. 8 is a graphical representation of a seventh screen shot, a second "Connect" screen 590. The connect tab, also referred to as the social tab, can include data relating to feedback, social links, other application systems that might be of interest to the user (such as sister applications), corporate information, industry information of the machine manufacturer/service provider, imprint, and the like. Many other data can be included in the connect tab, for example privacy policy, terms of use, and the like. As FIG. 8 shows, the different connect data can be arranged by panels and can be activated and entered by selecting the panels.

Figure 9:
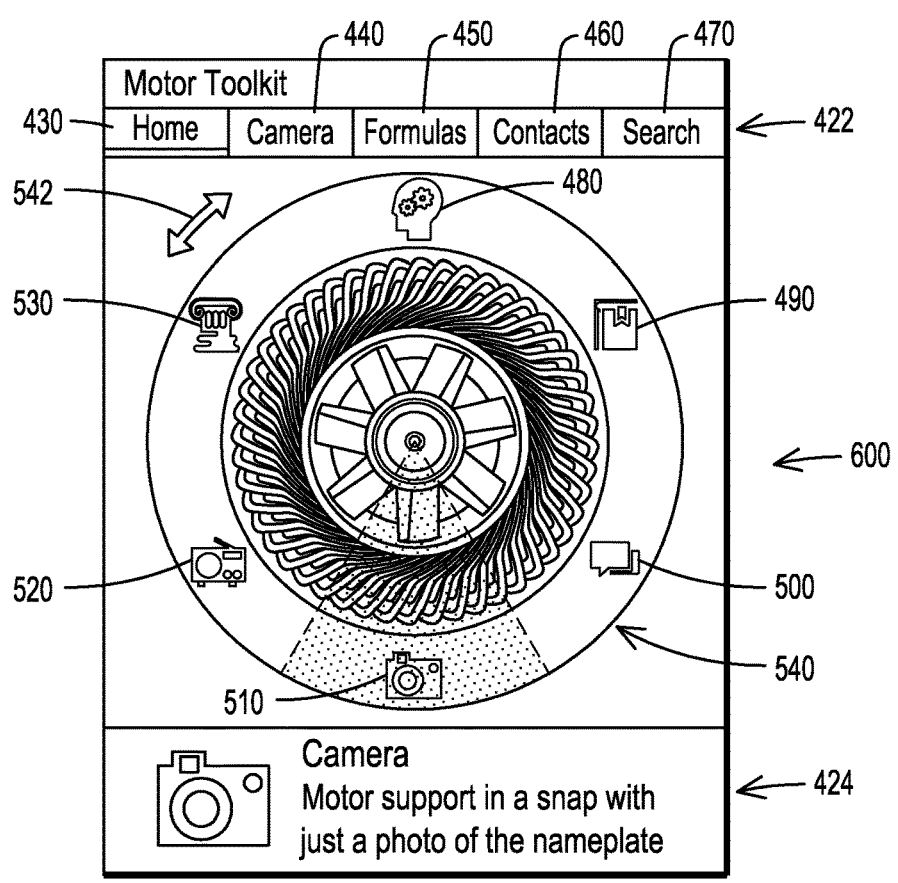
FIG. 9 is a graphical representation of an eighth screen shot of a user interface device, in accordance with an exemplary embodiment of the present invention.

FIG. 9 is a graphical representation of an eighth screen shot, a first "Camera" screen 600, where the tab 510 "Camera" is activated. The bottom panel 424 indicates that the tab 510 is active. The bottom panel 424 can provide a short summary for the user what the "Camera" data/application may include. For example, the short summary can read "Motor support in a snap with just a photo of the nameplate".

Figure 10:
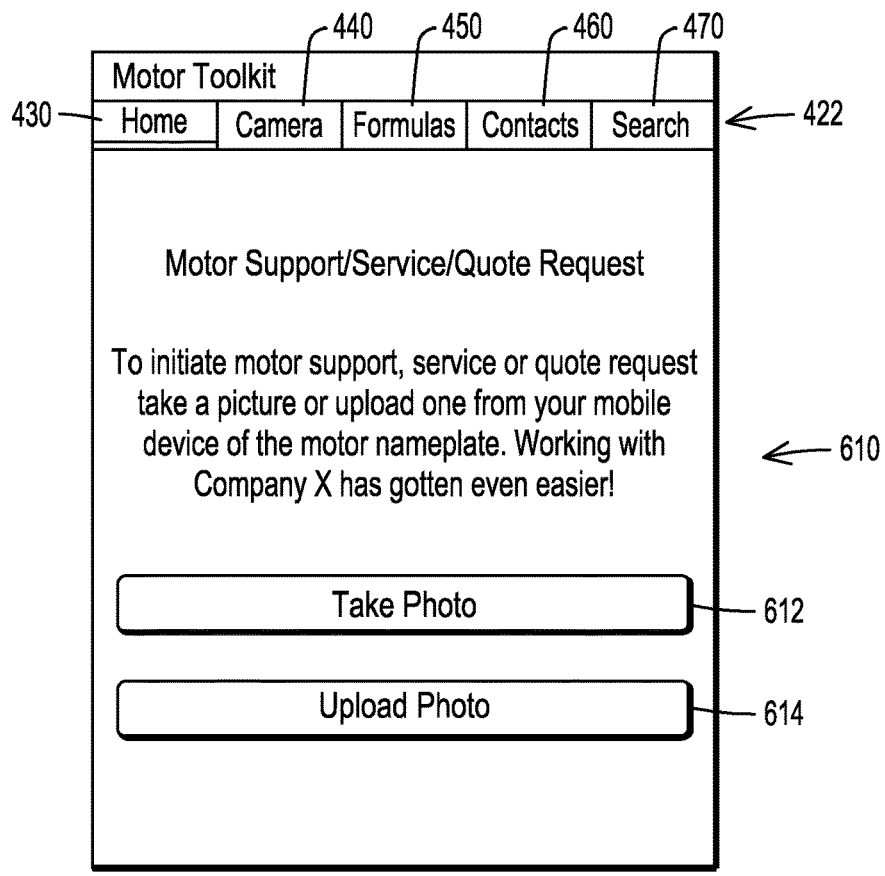
FIG. 10 is a graphical representation of a ninth screen shot of a user interface device, in accordance with an exemplary embodiment of the present invention.

FIG. 10 is a graphical representation of a ninth screen shot, a second "Camera" screen 610. The bottom panel 424 (see FIG. 9) has been touched and activated. Alternatively, the user can enter the camera application by selecting the tab 440 which can be located in the top panel 422. Activating the tab 440 or the tab 510 (see FIG. 9) can lead to the same camera application.

The camera tab can include data to initiate motor support, service, or a quote request. In order to receive motor support, service or a quote, the user can take a photo with the user interface device, for example a mobile device like a tablet or smart phone, or upload a photo of the nameplate of the motor the user needs a quote or support.

In an exemplary embodiment, the computer system 210 (see FIG. 1) can be in communication with a camera assembly which can be used for the camera application described in connection with FIGS. 9-13. The camera assembly may be carried within a housing of the computer system 210 and is adapted to capture color or black/white images of a subject. The camera assembly can have conventional characteristics of a digital camera, whereby the snapped image can be stored in a storage medium for use, an in an exemplary embodiment to forward along to the service provider/manufacturer/OEM, for example using the application system "Motor Toolkit," in particular the camera application, as described herein.

Figure 11:
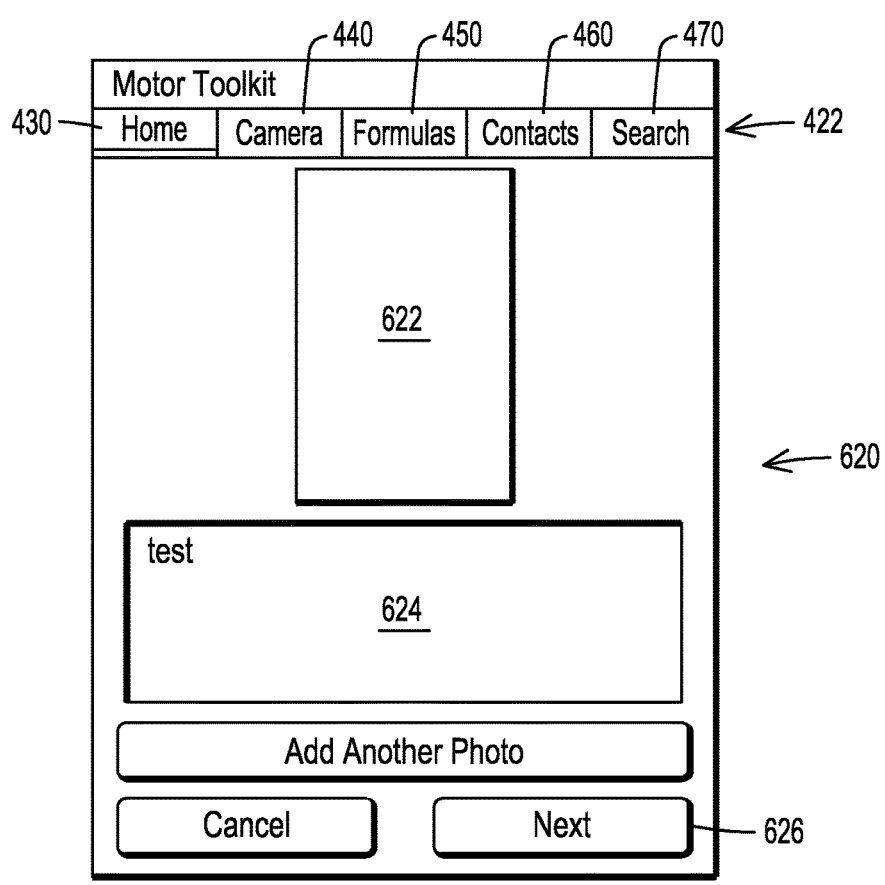
FIG. 11 is a graphical representation of a tenth screen shot of a user interface device, in accordance with an exemplary embodiment of the present invention.

FIG. 11 is a graphical representation of a tenth screen shot, a third "Camera" screen 620 which can be displayed after the panel 612 "Take Photo" or panel 614 "Upload Photo" (see FIG. 10) has been activated. In an exemplary embodiment, the camera assembly enables a user to snap a photo of a machine nameplate, such as a motor nameplate carried by the motor, along with supporting photographs of the motor. A sample photo is shown in area 622. In section 624, the user can provide additional comments and/or requests which can be forwarded along with the photo. As FIG. 11 shows, more than one photo can be taken or uploaded and forwarded.

Figure 12:
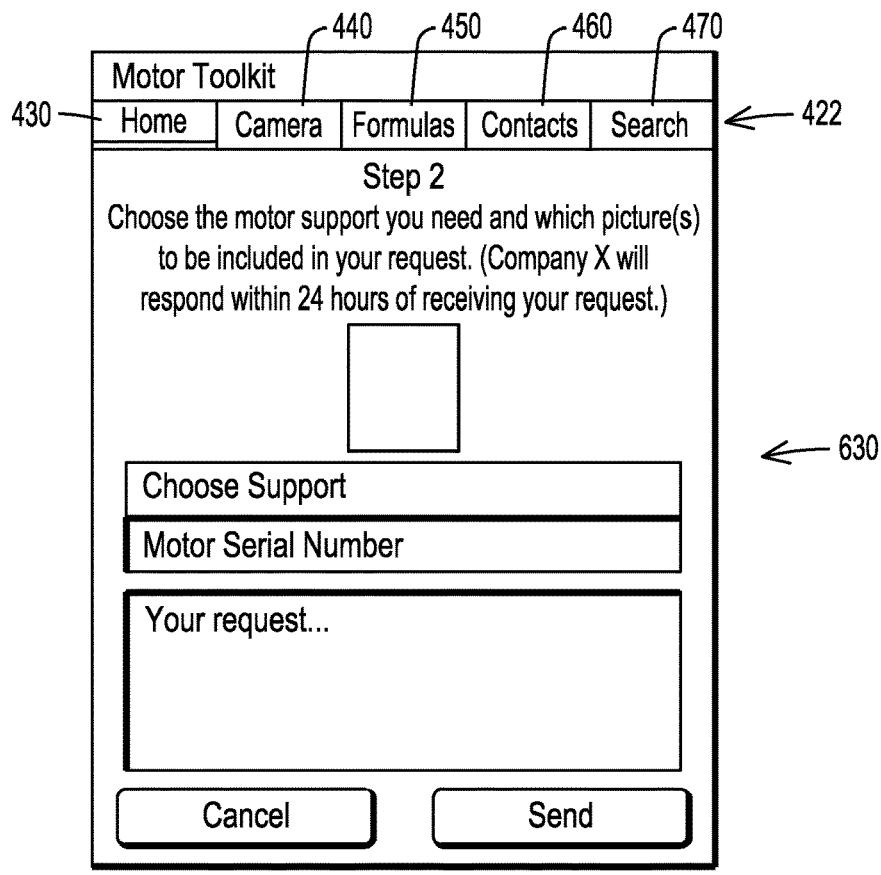
FIG. 12 is a graphical representation of an $11^{th}$ screen shot of a user interface device, in accordance with an exemplary embodiment of the present invention.

FIG. 12 is a graphical representation of an 11$^{th}$ screen shot, a fourth "Camera" screen 630 which can be displayed after one or more photo(s) have been taken or uploaded into the application system and the button 626 "Next" (see FIG. 11) has been activated. As FIG. 12 shows, data relating to the motor or motor parts of which the one or more photos have been taken need to be provided by the user, for example a motor serial number.

In another exemplary embodiment, the camera assembly is adapted to read and/or interpret a code, such as a barcode, Quick Response (QR) code, or like machine-readable representation of data. A barcode is a machine-readable optical label that contains information about the item to which it is attached. A QR code consists of black modules (square dots) arranged in a square grid on a white background, which can be read by an imaging device (such as a camera) and processed for example by the computer system 210 (FIG. 1). Such a code can be provided for example on the motor nameplate and can contain data to identify certain characteristics of the machine, for example the motor serial number. In an exemplary embodiment, a user would not need to type in the motor serial number. The code can also contain data relating to the motor or motor part, for example specified requirements and frame data which can be linked to further data and information, for example technical drawings of the motor. The data contained in the code can be read and forwarded along to the service provider/manufacturer/OEM within the camera application of the present application system.

Figure 13:
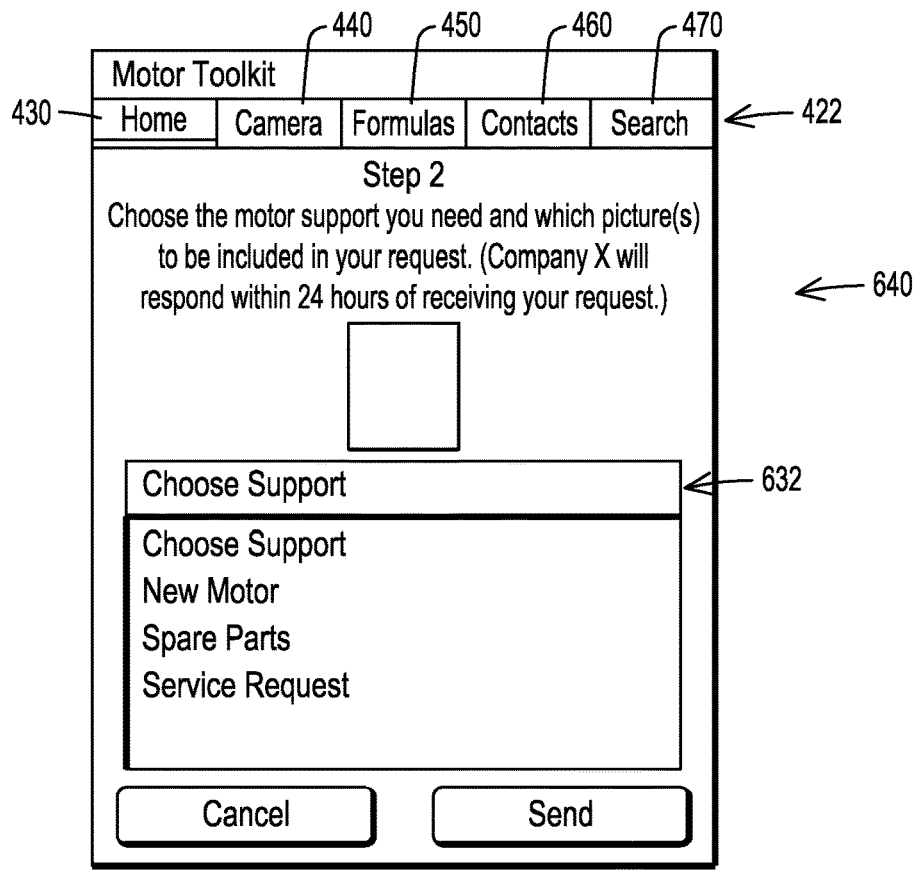
FIG. 13 is a graphical representation of a $12^{th}$ screen shot of a user interface device, in accordance with an exemplary embodiment of the present invention.

FIG. 13 is a graphical representation of a 12$^{th}$ screen shot, a fifth "Camera" screen 640 showing support options which can be selected after the panel 632 has been activated. Upon snapping a photo, or reading a code, the application can automatically connect the user with one or more support functions, for example and without limitation a motor quote, spare parts request, and/or a service request. According to panel 632 "Choose Support", the user can choose to which support function the photo and request should be forwarded. The support functions can include for example a motor quote ("New Motor"), spare parts requests ("Spare Part"), and service requests ("Service Request"). The panel 632 can comprise a drop down function with the different support functions listed in the drop down menu.

In an exemplary method, the user snaps an image of the machine nameplate, provides a brief description of the support function desired by a user and selects a support function, provides application details, such as ambient, cleanliness, pump, GPS tracking, and the like and forwards an electronic communication, for example and not limitation, an electronic mail (commonly called "e-mail"), browser submission, and the like to the service provider/manufacturer/OEM.

In an exemplary embodiment, an e-mail can be generated to the proper service group with regards to for example spare parts quote, service quote, motor trouble shooting, up sell for service, and the like. In another exemplary embodiment, an e-mail can be generated to the proper sales group with regards to for example new motor quote, up sell for motor testing/features.

In an exemplary embodiment, within the application system, the user is asked to "opt in" to use GPS tracking for local support as well as gather installed base data.

Figure 14:
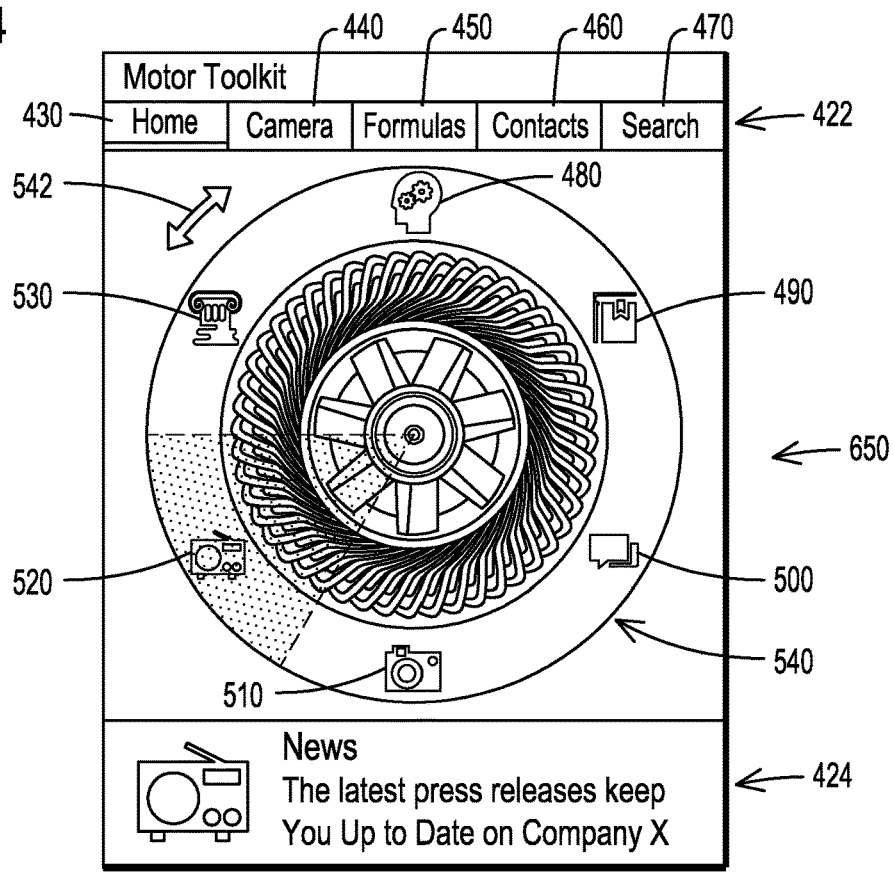
FIG. 14 is a graphical representation of a $13^{th}$ screen shot of a user interface device, in accordance with an exemplary embodiment of the present invention.

FIG. 14 is a graphical representation of a 13$^{th}$ screen shot, a "News" screen 650, and the tab 520 is activated. The bottom panel 424 indicates that the "News" tab 520 is active. The bottom panel 424 can provide a short summary for the user what the "News" data may include. For example and without limitation, the summary can read "The latest press releases keep you up to date on Company X".

Figure 15:
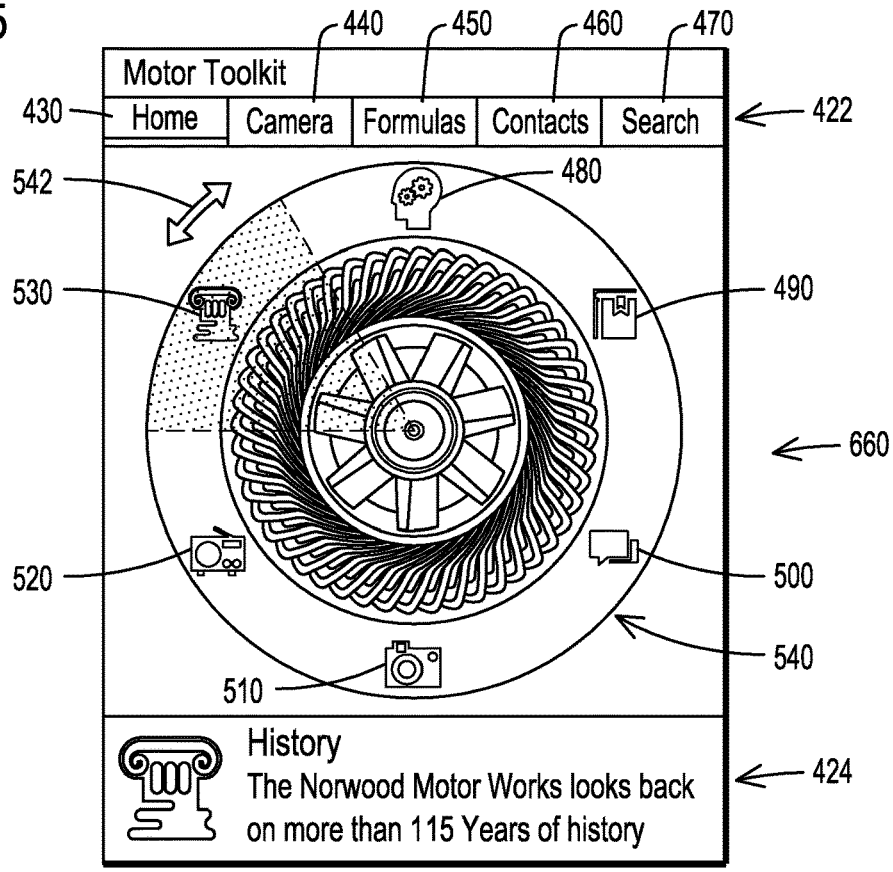
FIG. 15 is a graphical representation of a $14^{th}$ screen shot of a user interface device, in accordance with an exemplary embodiment of the present invention.

FIG. 15 is a graphical representation of a 14$^{th}$ screen shot, a first "History" screen 660, where the tab 530 "History" is active. The bottom panel 424 displays that the tab 530 is active. In this exemplary embodiment, the history data provided relate to a specific facility/business unit (for example and without limitation, "The Norwood Motor Works looks back on more than 115 years of history"). But the history data can comprise many other data relating to history of many other facilities or business units.

Figure 16:
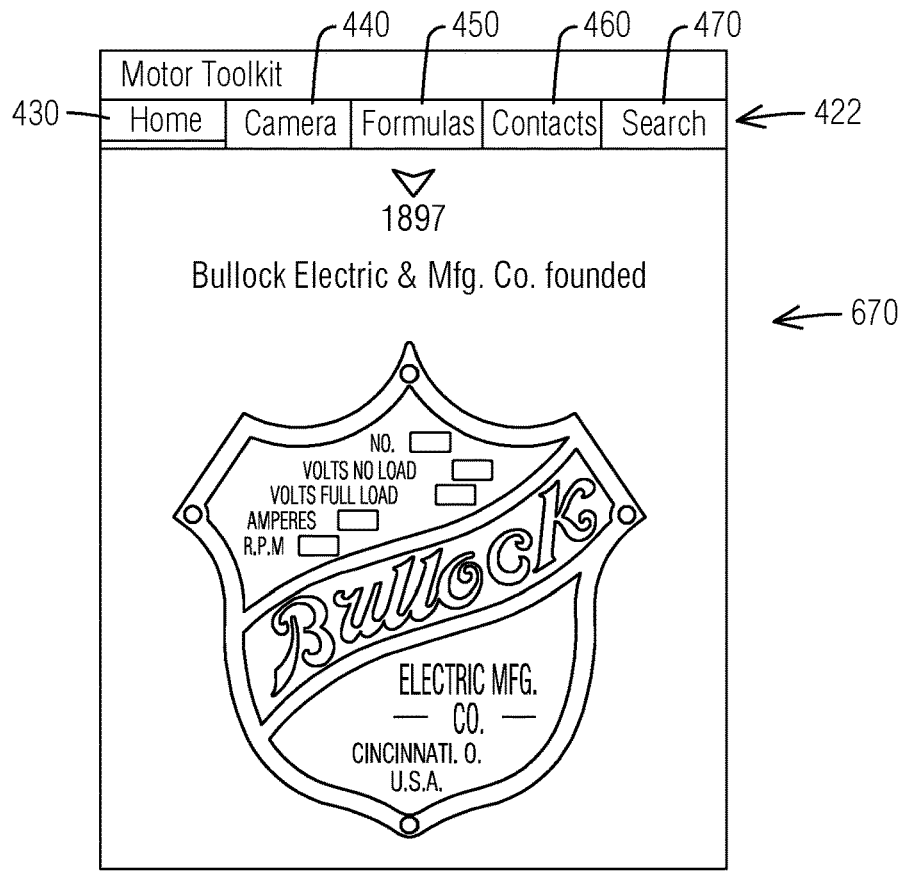
FIG. 16 is a graphical representation of a $15^{th}$ screen shot of a user interface device, in accordance with an exemplary embodiment of the present invention.

FIG. 16 is a graphical representation of a 15$^{th}$ screen shot, a second "History" screen 670, where the history data are entered. A focus, for example a manual focus, can be provided. The user can scroll vertically through the history data.

Figure 17:
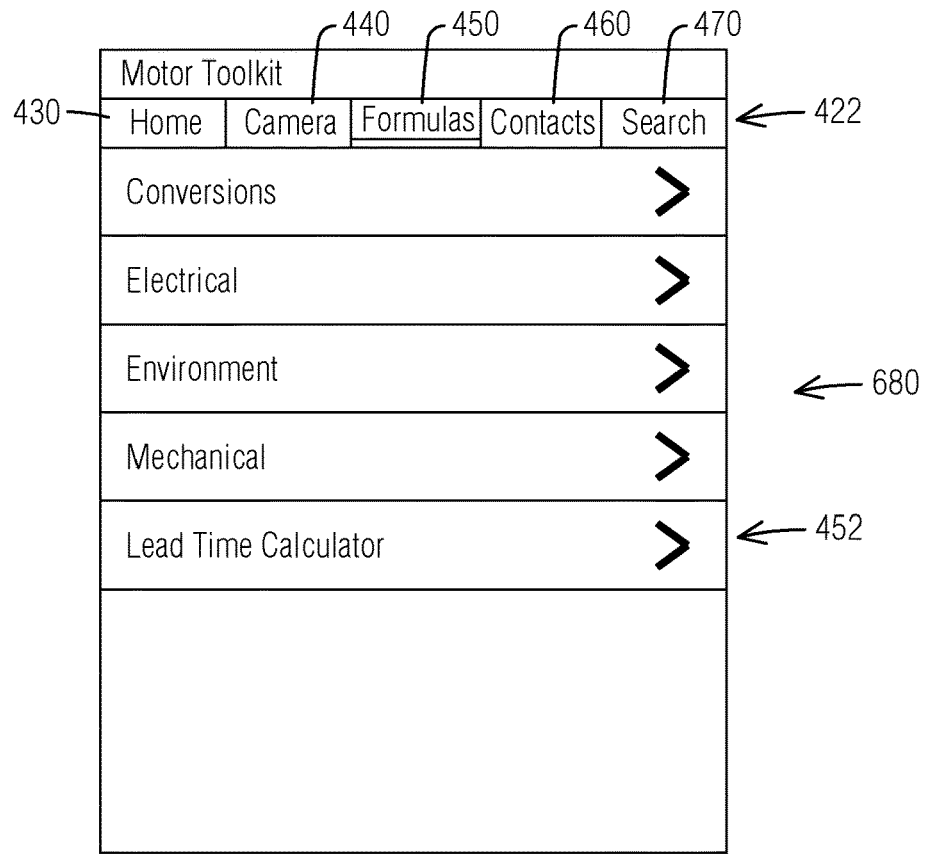
FIG. 17 is a graphical representation of a $16^{th}$ screen shot of a user interface device, in accordance with an exemplary embodiment of the present invention.

FIG. 17 is a graphical representation of a 16$^{th}$ screen shot, a "Formulas" screen 680, where the tab 450 "Formulas" is active. The formulas tab can include conversions, electrical formulas, environment, mechanical formulas and a lead time calculator. Conversions can include for example temperature conversion ° F. to ° C. or torque conversion lb*ft to N*m and the like. Electrical formulas can include for example calculations of Three Phase Full Load Amps (kW). Environment can include for example ambient adjustment and altitude adjustment. Mechanical formulas can include for example calculations regarding Torque/HP. The lead time calculator can be represented by the panel 452 which is explained in more detail in FIG. 18. The formulas tab empowers users to answer common motor questions by using formulas built into the mobile application system. For example, questions like "How much HP does my application require for the given torque?" or "How much do I need to de-rate the motor for a higher than standard elevation?" can be accurately and confidently resolved.

Figure 18:
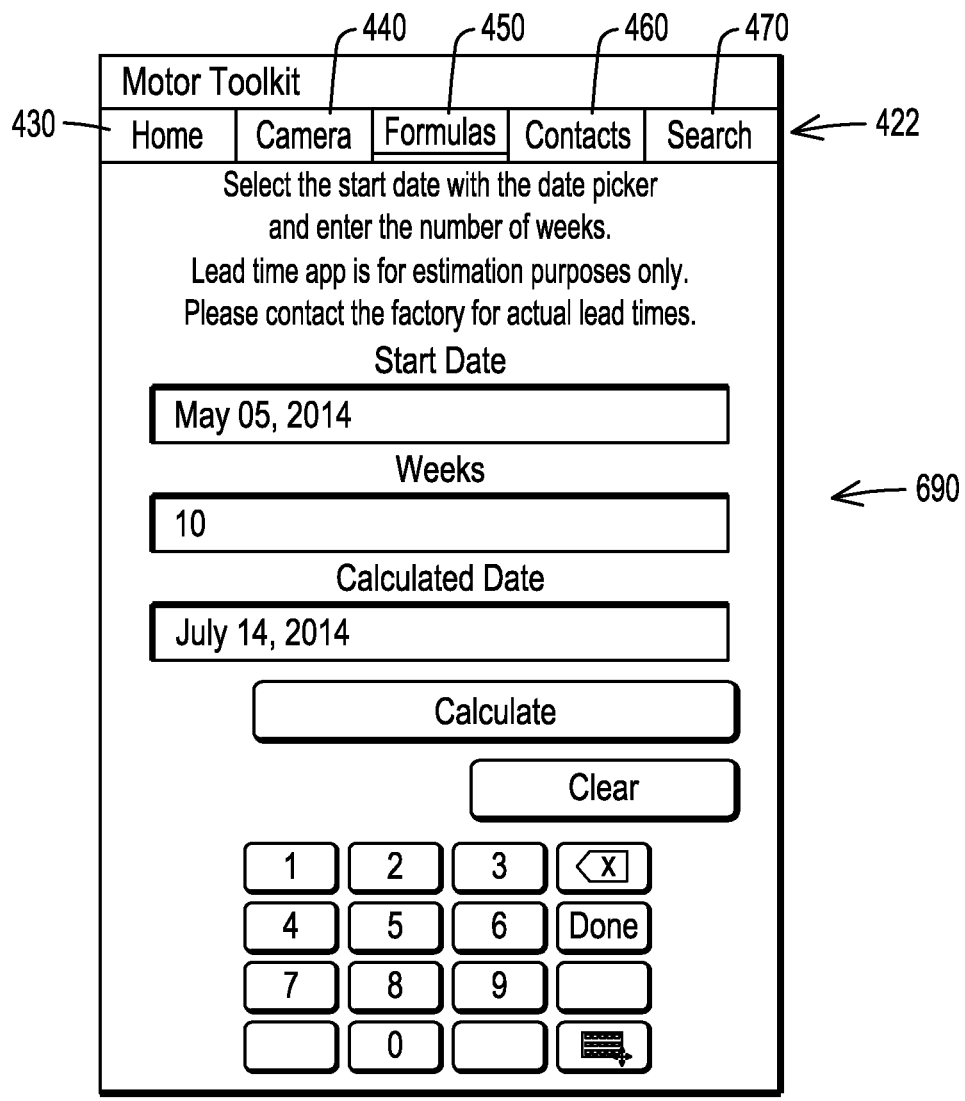
FIG. 18 is a graphical representation of a 17$^{th}$ screen shot of a user interface device, in accordance with an exemplary embodiment of the present invention.

FIG. 18 is a graphical representation of a 17$^{th}$ screen shot, a "Lead Time Calculator" screen 690 which can be displayed after the user has activated the panel 452 "Lead Time Calculator" as shown in FIG. 17. As can be seen, the user can enter a start date, for example May 5, 2014, and a number of weeks, for example 10 weeks, and the lead time is calculated, which in this example is Jul. 14, 2014. Such a Lead Time Calculator enables the user, for example project managers, purchasing agents and buyers to coordinate motor lead times with internal processes to minimize plant downtime and streamline project scheduling. Since motors are typically one of the longer lead times, this tool provides greater confidence for the user in planning outages.

FIG. 19 is a graphical representation of a 18th screen shot, a "Contacts" screen 700 which can be displayed after the tab 460 has been activated. The contacts tab can include for example motor quotes, distributor location and technical support & field services, and the like. For example, when the user needs a motor quote, he can enter the panel 462 where the quotes can be obtained via email or phone.

FIG. 20 is a graphical representation of a 19th screen shot, a "Search" screen 710 which can be displayed after the user has activated the tab 470. The search tab 470 can include many topics to be searched, for example motor training, manuals ("App Manual Lite"), different types/assemblies of motors ("F1 Assembly" etc.) and the like.

As FIGS. 3-20 show, while toggling through the different tabs using the wheel 540 or the top panel 422 (FIG. 3), the panel 422 can always be displayed.

In an exemplary embodiment, the application system provides the user with a secure way to receive motor quotes or support. For example, a password protection allows the user to get budget quotations for certain products. For example, before entering the camera/quote data and application, the user is required to register with a username and password.

Customers may now receive fast and reliable service. If necessary, customers will also be able to seek support at their request without initially involving sales. This feature can tackle customer challenges like navigating complex vendor organizations by offering the customer a direct link to motor support, getting technical support in remote locations, communicating at the speed of business by offering instant answers for an instant business culture and maximizing productivity and operation effectiveness by offering direct quotations.

Users are provided easy access to obtain motor quotations, spare parts quotations and service quotations. In addition, by providing common motor formulas and a lead time calculator, users will be able to plan projects and plant downtime more effectively. The service provider, which is for example a manufacturer or OEM, is able to create conversations with the user, i.e. customers, and strengthen customer partnerships. The service provider is able to operate more efficiently by presenting answers to customer questions via the application system even before the user asks and by having the users generate leads at their request without initially involving different departments, for example sales.

In accordance with an exemplary embodiment of the present invention, the data comprises an image of a nameplate of the at least one part of the electric machine, and the computer program further comprises instructions to upload and store the image of the nameplate.

In accordance with an exemplary embodiment of the present invention, the data comprises an image of a nameplate of the at least one part of the electric machine, wherein the image of the nameplate is captured with an imaging device, and wherein the computer program further comprises instructions to store the image of the nameplate.

In accordance with an exemplary embodiment of the present invention, the imaging device is a digital camera.

In accordance with an exemplary embodiment of the present invention, the computer program further comprises instructions to read a QR code carried by the at least one part of the electric machine, and wherein the data transmitted in the electronic communication relates to the QR code.

In accordance with an exemplary embodiment of the present invention, the QR code is read by an imaging device in communication with the user interface device.

In accordance with an exemplary embodiment of the present invention, the computer program further comprises instructions to read a barcode carried by the at least one part of the electric machine, wherein the data transmitted in the electronic communication relates to the barcode.

In accordance with an exemplary embodiment of the present invention, the barcode is read using an imaging device in communication with the user interface device.

In accordance with an exemplary embodiment of the present invention, the computer program further comprises instructions to store the data relating to the at least one part of the electric machine in the memory device.

In accordance with an exemplary embodiment of the present invention, the user interface device is selected from the group consisting of a touchscreen device, a tablet, a smart phone, and a handheld computing device.

In accordance with an exemplary embodiment of the present invention, the computer program further comprises instructions to display a plurality of service options on a screen of the user interface device, and wherein the electronic communication comprises a selected service option.

In accordance with an exemplary embodiment of the present invention, the electronic communication is selected from the group consisting of an electronic mail transmission (e-mail) and an SMS communication.

In accordance with an exemplary embodiment of the present invention, a response to the electronic communication for requesting a quote, processing an order, or requesting support of the electric machine comprises a quote, a response to an order request, or a response to a support request.

In accordance with an exemplary embodiment of the present invention, the response to the electronic communication for requesting a quote, processing an order, or requesting support includes a communication selected from the group consisting of an electronic mail transmission (e-mail), an SMS communication, and a telecommunication.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A non-transitory computer-readable medium having stored thereon executable instructions that when executed by a computing device, cause the computing device to perform operations comprising:
displaying a plurality of sets of data housed under different tabs on a touch screen of a user interface device, the tabs being arranged in a navigation radar wheel such that a tab is selectable by toggling through the navigation radar wheel on the touch screen, wherein a first set of data housed under a first tab comprises
capturing data of at least one part of an electric machine,
storing the data of the at least one part of the electric machine, and
transmitting an electronic communication containing the data via a communication network for requesting a quote, processing an order, or requesting support of the electric machine, and further comprising
displaying a plurality of support options on the touch screen, wherein the plurality of support options comprises a quote option, a spare parts request option and a service request option with respect to the electric machine, and wherein the electronic communication comprises a selected support option, and wherein a second set of data housed under a second tab comprises
    displaying input fields allowing a user to provide input data for calculations relating to the electric machine using built in electrical or mechanical formulas,
    executing the built in electrical or mechanical formulas using the input data, and
    displaying results of the calculations to the user via the touch screen.

2. The non-transitory computer-readable medium of claim 1, the operations further comprising reading a QR code, wherein the QR code is carried by the at least one part of the electric machine, and wherein the data transmitted in the electronic communication relates to the QR code.

3. The non-transitory computer-readable medium of claim 1, the operations further comprising reading a barcode.

4. The non-transitory computer-readable medium of claim 3, wherein the barcode is carried by the at least one part of the electric machine, and wherein the data transmitted in the electronic communication relates to the barcode.

5. The non-transitory computer-readable medium of claim 1, wherein the electronic communication is selected from the group consisting of an electronic mail transmission (e-mail) and an SMS communication.

6. A method for requesting a quote, processing an order, or requesting support for at least one part of an electric machine, the method comprising:
    displaying a plurality of sets of data housed under different tabs on a touch screen of a user interface device, the tabs being arranged in a navigation radar wheel such that a tab is selectable by toggling through the navigation radar wheel on the touch screen,
    selecting a first set of data under a first tab,
    capturing data of at least one part of an electric machine,
    storing the data of the at least one part of the electric machine,
    selecting a support option from a plurality of support options, wherein the plurality of support options comprises a quote option, a spare parts request option and a service request option with respect to the electric machine,
    transmitting an electronic communication containing the data via a communication network for requesting a quote, processing an order, or requesting support of the electric machine, wherein the electronic communication comprises a selected support option, and
    responding to the electronic communication via the communication network, and further comprising
    selecting a second set of data under a second tab,
    displaying input fields allowing a user to provide input data for calculations relating to the electric machine using built in electrical or mechanical formulas,
    executing the built in electrical or mechanical formulas using the input data, and
    displaying results of the calculations to the user via the touch screen.

7. The method of claim 6, further comprising reading a barcode carried by the at least one part of the electric machine, wherein the data relates to the barcode.

8. The method of claim 6, further comprising reading a QR code carried by the at least one part of the electric machine, wherein the data relates to the QR code.

9. The method of claim 6, wherein the responding to the electronic communication for requesting a quote, processing an order, or requesting support of the electric machine comprises a quote, a response to an order request, or a response to a support request.

10. The method of claim 9, wherein the responding to the electronic communication for requesting a quote, processing an order, or requesting support includes a communication selected from the group consisting of an electronic mail transmission (e-mail), an SMS communication, and a telecommunication.

* * * * *